US009389607B2

(12) United States Patent
Wakabayashi (10) Patent No.: US 9,389,607 B2
(45) Date of Patent: Jul. 12, 2016

(54) METHOD FOR SETTING SUBSTRATE-TREATMENT TIME, AND STORAGE MEDIUM

(75) Inventor: Shinji Wakabayashi, Yamanashi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 419 days.

(21) Appl. No.: 14/122,987

(22) PCT Filed: Jun. 18, 2012

(86) PCT No.: PCT/JP2012/066090
§ 371 (c)(1),
(2), (4) Date: Nov. 27, 2013

(87) PCT Pub. No.: WO2012/176914
PCT Pub. Date: Dec. 27, 2012

(65) Prior Publication Data
US 2014/0188267 A1    Jul. 3, 2014

(30) Foreign Application Priority Data

Jun. 24, 2011  (JP) ................................. 2011-140459

(51) Int. Cl.
*G05B 19/418*     (2006.01)
(52) U.S. Cl.
CPC ....... *G05B 19/41865* (2013.01); *G05B 2219/31429* (2013.01); *G05B 2219/45031* (2013.01); *Y02P 90/20* (2015.11)
(58) Field of Classification Search
CPC ............... G05B 19/41865; G05B 2219/45031; Y02P 90/20
USPC ........................................................ 700/121
See application file for complete search history.

(56) References Cited

U.S. PATENT DOCUMENTS 5,943,230 A    8/1999  Rinnen et al.
7,139,631 B2 *  11/2006  Oh ................... G05B 19/41865
                                                 700/112

(Continued)

FOREIGN PATENT DOCUMENTS

JP    10-326731 A    12/1998
JP    2001-351964 A  12/2001

(Continued)

OTHER PUBLICATIONS

International Search Report mailed Sep. 18, 2012 in PCT/JP2012/066090.

*Primary Examiner* — Luat Phung
*Assistant Examiner* — Tri T Nguyen
(74) *Attorney, Agent, or Firm* — Rothwell, Figg, Ernst & Manbeck, P.C.

(57) ABSTRACT

In a method for setting substrate-treatment time, substrate-treatment time is set by the following method. A predicted supply time of wafers of a following lot to a substrate processing apparatus is calculated based on a predicted plasma-treatment completion time of another substrate processing apparatus. A predicted plasma-treatment completion time of all of wafers of a present lot is calculated. A predicted idle time after the completion of the plasma treatment of all of the wafers of the present lot is calculated based on the predicted supply time of the following lot and the predicted plasma-treatment completion time of the present lot. If the predicted idle time is equal to or longer than the idle time required for dummy treatment, supplementary idle time is added between the plasma treatments of unprocessed wafers of the present lot.

7 Claims, 7 Drawing Sheets

(56) References Cited

U.S. PATENT DOCUMENTS

7,630,785 B2 * 12/2009 Ikeda .............. G05B 19/41865
700/100
2005/0233477 A1  10/2005 Yamazaki et al.

FOREIGN PATENT DOCUMENTS

| JP | 2006-121030 A | | 5/2006 |
| JP | 2011-91334 A | | 5/2011 |
| JP | 2011091334 A | * | 5/2011 |

* cited by examiner

FIG.3

FIG. 4

METHOD FOR SETTING SUBSTRATE-TREATMENT TIME, AND STORAGE MEDIUM

CROSS REFERENCE TO RELATED APPLICATION

This application is a 35 U.S.C. 371 National Phase Entry Application from PCT/JP2012/066090, filed Jun. 18, 2012, which claims the benefit of Japanese Patent Application No. 2011-140459, filed Jun. 24, 2011, the disclosures of which are incorporated herein in their entirety by reference.

FIELD OF THE INVENTION

The present invention relates to a method for setting substrate-treatment time and a storage medium.

BACKGROUND OF THE INVENTION

In a substrate processing apparatus for performing plasma treatment, e.g., dry etching or film formation, on a semiconductor device wafer (hereinafter, simply referred to as "wafer") as a substrate, a single lot including a plurality of, e.g., 25, wafers is supplied while being accommodated in a container (carrier). Further, in the substrate processing apparatus, wafers are taken one by one from the supplied carrier to be subjected to plasma treatment.

In order to manufacture a semiconductor device, it is required to perform several types of plasma treatments on a wafer. However, a single substrate processing apparatus cannot perform all the required plasma treatments on the wafer. Therefore, a few types of plasma treatments are performed on a wafer by a single substrate processing apparatus and, then, other types of plasma treatments are performed on the wafer by another substrate processing apparatus. The wafers are transferred lot by lot between the substrate processing apparatuses while being accommodated in a carrier.

Since the different substrate processing apparatuses perform different plasma treatments on the wafer, time required to perform predetermined plasma treatment on all the wafers of a single lot is different between the substrate processing apparatuses. Therefore, a substrate processing apparatus for performing second half steps of the semiconductor device manufacturing process may be in a standby state (idle state) until the completion of the plasma treatment of all the wafers of a single lot in a substrate processing apparatus for performing first half steps.

In the idle state, the processing module of the substrate processing apparatus does not perform plasma treatment. Therefore, the state in the processing chamber of the processing module is changed from the state most suitable for predetermined plasma treatment. If the idle state is excessively long, the state in the processing chamber may be changed to the state unsuitable for the predetermined plasma treatment. Therefore, before the predetermined plasma treatment is performed on each of wafers of a following lot in a carrier, dummy treatment similar to the predetermined plasma treatment is performed on a dummy wafer that has been loaded into the processing chamber. As a consequence, the state in the processing chamber is changed to the state suitable for the predetermined plasma treatment. Whether or not the dummy treatment is required is determined based on whether or not a period of time of the idle state is longer than a predetermined period of time (see, e.g., Japanese Patent Application Publication No. 2006-121030.)

Since, however, the dummy treatment is essentially unnecessary, even if it is performed only a few times, the throughput is decreased. Moreover, the cost is increased due to a dummy wafer required for the dummy treatment.

SUMMARY OF THE INVENTION

In view of the above, the present invention provides a method for setting substrate-treatment time which can suppress dummy treatment as much as possible, and a storage medium.

In accordance with a first aspect of the present invention, there is provided a method for setting substrate-treatment time in a substrate processing apparatus for performing predetermined treatment on substrates of a single lot one by one, the method including: a first calculation step of calculating predicted supply time of a second lot to the substrate processing apparatus, the second lot being supplied to the substrate processing apparatus after a first lot including a substrate that is currently subjected to the predetermined treatment in the substrate processing apparatus; a second calculation step of calculating predicted completion time of the predetermined treatment of all of the substrates of the first lot; a third calculation step of calculating predicted standby time after the completion of the predetermined treatment of all the substrates of the first lot in the substrate processing apparatus based on the calculated predicted supply time and the calculated predicted completion time; a determination step of determining whether or not the calculated predicted standby time is longer than a reference standby time required for dummy treatment; and an additional setting step of additionally setting, when the calculated predicted standby time is equal to or longer than the reference standby time, supplementary standby time between the predetermined treatments of unprocessed substrates of the first lot.

In the first aspect, the method for setting substrate-treatment time preferably further includes: another determination step of determining, in the case where the supplementary standby time is additionally set in the additional setting step, whether or not another standby time after the completion of the predetermined treatment of all the substrates of the first lot is longer than the reference standby time; and a deletion step of deleting, when said another standby time is longer than the reference standby time, the additionally set supplementary standby time.

In the first aspect, each supplementary standby time preferably has the same length.

In the first aspect, when another predetermined treatment of a first substrate of the second lot is completed in another substrate processing apparatus, a predicted supply time of the second lot to the substrate processing apparatus is preferably calculated by executing the first calculation step.

In the first aspect, the supplementary standby time is preferably shorter than the reference standby time.

In accordance with a second aspect of the present invention, there is provided a computer readable storage medium storing a program for executing in a computer a method for setting substrate-treatment time in a substrate processing apparatus for performing predetermined treatment on substrates of a single lot one by one, wherein the method for setting substrate-treatment time includes: a first calculation step of calculating predicted supply time of a second lot to the substrate processing apparatus, the second lot being supplied to the substrate processing apparatus after a first lot including a substrate that is currently subjected to the predetermined treatment in the substrate processing apparatus; a second calculation step of calculating predicted completion time of the predetermined treatment of all of the substrates of the first lot; a third calculation step of calculating predicted standby time after the completion of the predetermined treatment of all the substrates of the first lot in the substrate processing apparatus based on the calculated predicted supply time and the calculated predicted completion time; a determination step of determining whether or not the calculated predicted standby time is equal to or longer than a reference standby time required for dummy treatment; and an additional setting step of additionally setting, when the calculated predicted standby time is equal to or longer than the reference standby time, supplementary standby time between the predetermined treatments of unprocessed substrates of the first lot.

In the second aspect, the method for setting substrate-treatment time preferably further includes: another determining step of determining, in the case where the supplementary standby time is set in the additional setting step, whether or not another standby time after the completion of the predetermined treatment of all the substrates of the first lot is longer than the reference standby time; and a deletion step of deleting, when said another standby time is longer than the reference standby time, the additionally set supplementary standby time.

EFFECTS OF THE INVENTION

In accordance with the present invention, the predicted idle time after the completion of the predetermined treatment of all of the substrates of the first lot in the substrate processing apparatus is calculated based on the predicted supply time of the second lot to the substrate processing apparatus after the supply of the first lot including a substrate that is currently subjected to the predetermined treatment in the substrate processing apparatus and the predicted completion time of the predetermined treatment of all of the wafers of the first lot. When the calculated predicted idle time is equal to or longer than the reference standby time for dummy treatment, the supplementary idle time is additionally set between the predetermined treatments of unprocessed substrates of the first lot. Therefore, the completion time of the predetermined treatment of all of the substrates of the first lot can be extended. Accordingly, the actual idle time can be shorter than the reference standby time. As a result, the dummy treatment can be suppressed as much as possible.

DETAILED DESCRIPTION OF THE EMBODIMENTS

Hereinafter, embodiments of the present invention will be described with reference to the accompanying drawings.

Figure 1:
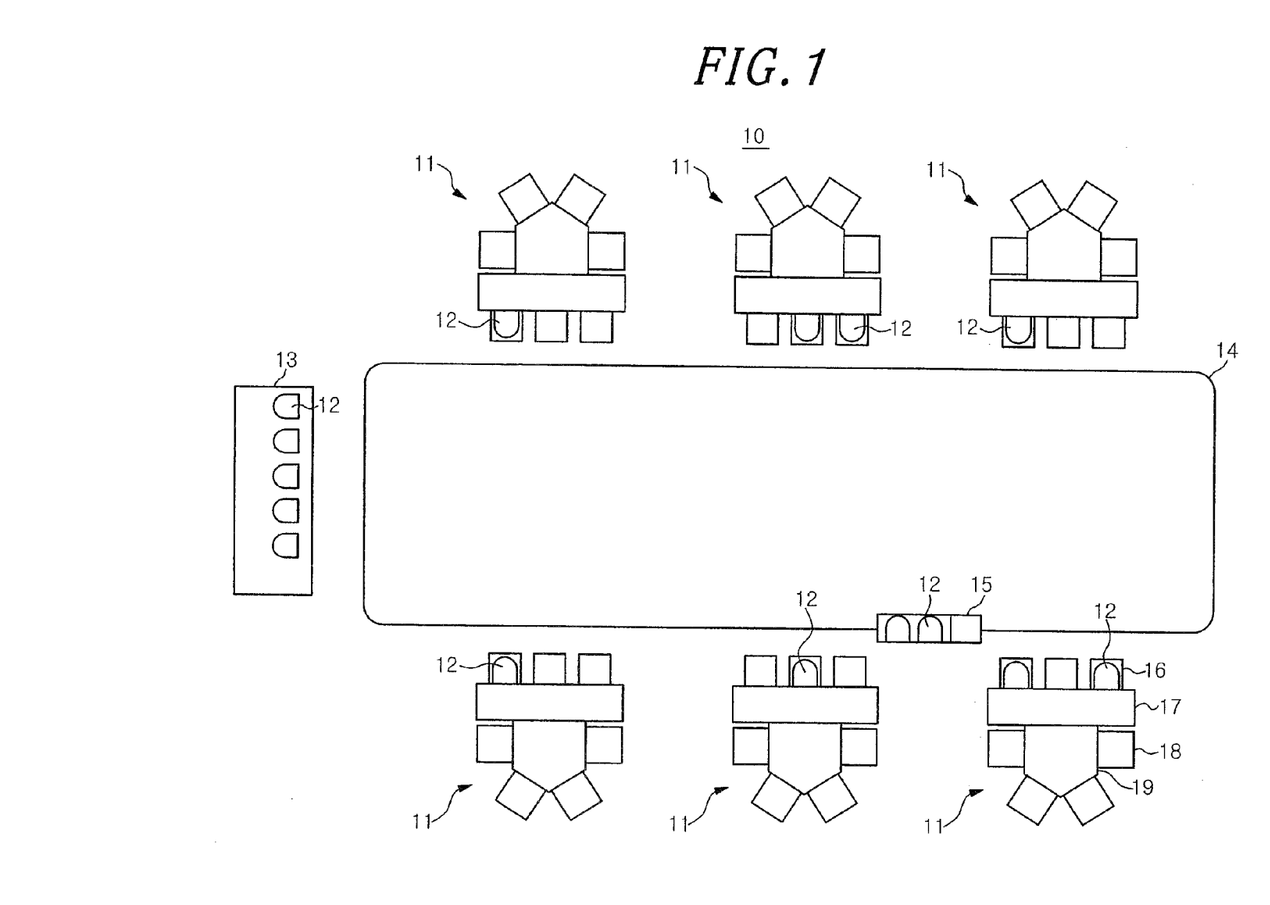
FIG. 1 is a top view for explaining a substrate processing apparatus for performing a method for setting substrate-treatment time in accordance with an embodiment of the present invention and related devices.

FIG. 1 is a top view for explaining a substrate processing apparatus for performing a method for setting substrate-treatment time in accordance with an embodiment of the present invention and related devices.

Referring to FIG. 1, in a clean room 10 of a semiconductor device manufacturing factory, there are provided six substrate processing apparatuses 11, a stocker 13 accommodating therein a plurality of carriers 12, and an AMHS (Automated Material Handling System) 15 such as an OHT (Overhead Hoist Transport) or the like which is moved along a guide 14 extending in the vicinity of the substrate processing apparatuses 11 and the vicinity of the stocker 13. Each of the substrate processing apparatuses 11, the stocker 13 and the AMHS 15 can communicate with a host computer (not shown) that is wiredly or wirelessly connected thereto.

A single carrier 12 accommodates therein a single lot including, e.g., 25, wafers. Each of the carriers 12 is transferred between the stocker 13 and each of the substrate processing apparatuses 11 by the AMHS 15. When the carrier 12 is loaded into each of the substrate processing apparatuses 11, plasma treatment, e.g., dry etching or film formation, is performed on each of the wafers accommodated in the carrier 12 by the corresponding substrate processing apparatus 11.

Each of the substrate processing apparatuses 11 includes: three loading ports 16 for receiving the loaded carrier 12; a single loader module 17 for unloading wafers from the carrier 12 received by the corresponding loading port 16 and loading plasma-treated wafers into the carrier 12; a transfer module 19, connected to the corresponding loader module 17, for transferring wafers between the loader module 17 and processing modules 18 to be described later; the processing modules 18, disposed so as to surround the corresponding transfer module 19, for loading wafers into the processing chambers and performing plasma treatment on the wafers; and a controller (not shown) for controlling the operations of the respective modules.

In the substrate processing apparatus 11, unprocessed wafers are unloaded one by one from the carrier 12 and then transferred from the loading port 16 into the processing chambers of the processing modules 18 via the loader module 17 and the transfer module 19. Processed wafers are transferred one by one from the processing chambers of the processing modules 18 into the loading port 16, via the transfer module 19 and the loader module 17 and then accommodated in the carrier 12.

After the plasma treatment is performed on each of the wafers and the processed wafers of a single lot are accommodated in the carrier 12, the corresponding carrier 12 is unloaded from the substrate processing apparatus 11 and loaded into a substrate processing apparatus 11 for performing next plasma treatment on each wafer by the AMHS 15. Accordingly, a single substrate processing apparatus 11 repetitively performs the same plasma treatment on each wafer of multiple lots.

However, since different substrate processing apparatuses 11 perform different types of plasma treatments on the wafers, time required to perform the plasma treatment on each of the wafers of a single lot is different between the substrate processing apparatuses 11. Further, even after the completion of the plasma treatment of all the wafers of a lot including a wafer that is currently subjected to plasma treatment (hereinafter, referred to as "present lot") (first lot), a lot to be supplied after the present lot (hereinafter, referred to as "following lot") (second lot) may not be supplied. In that case, after the completion of the plasma treatment of all the wafers of the present lot, the processing modules 18 of the substrate processing apparatus 11 are in an idle state without performing plasma treatment.

Figure 2:
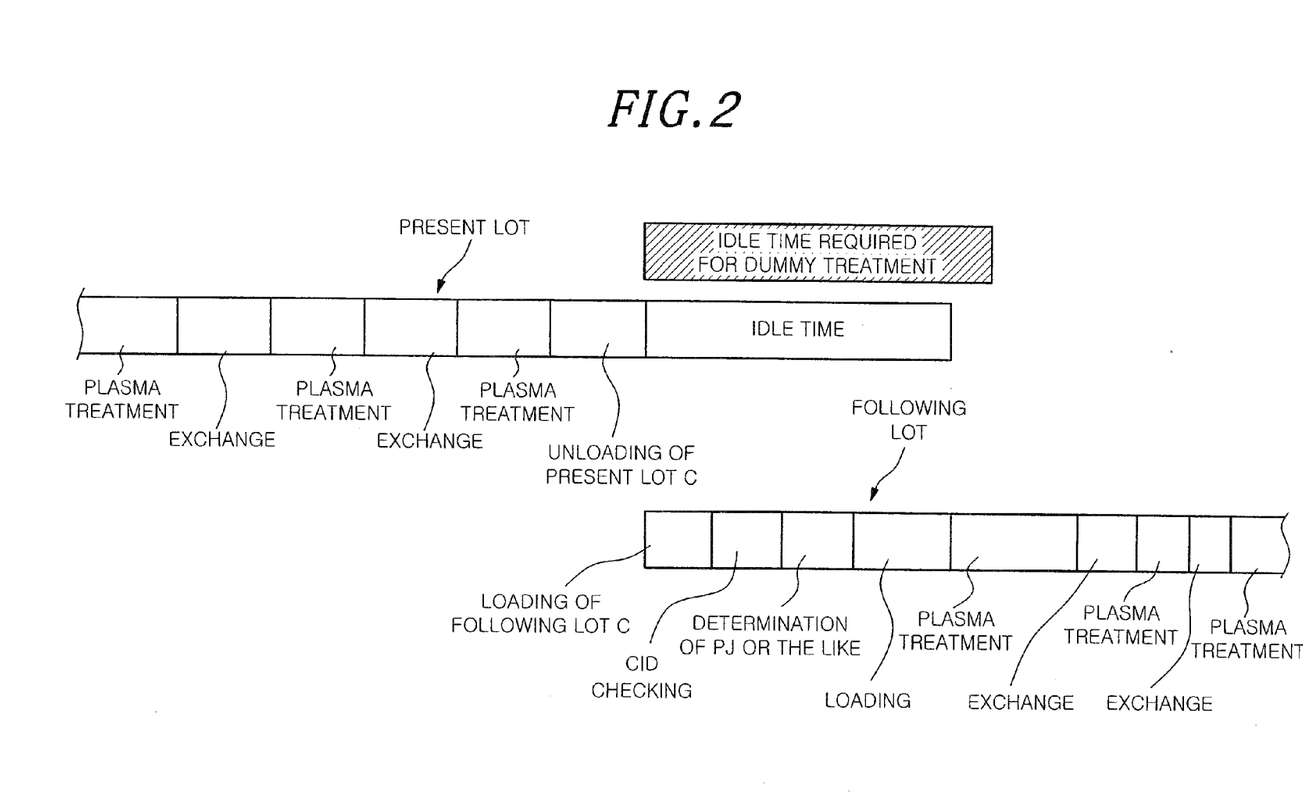
FIG. 2 is a time chart for explaining idle time.

FIG. 2 is a time chart for explaining idle time. A horizontal direction in FIG. 2 corresponds to elapse of time.

Referring to FIG. 2, after all the wafers of the present lot are plasma-treated by repeating the plasma treatment and the loading/unloading (indicated by "exchange" in the drawing) of the wafers between the carrier 12 and the processing chambers of the processing modules 18 in one substrate processing apparatus 11, the carrier 12 accommodating therein the processed wafers of a single lot is unloaded from the substrate processing apparatus 11 by the AMHS 15 (indicated by "unloading of present lot C" in the drawing).

Next, the carrier 12 accommodating therein wafer of a following lot is loaded into the corresponding substrate processing apparatus 11 (indicated by "loading of following lot C" in the drawing) by the AMHS 15. However, the plasma treatment of the wafers of the following lot is not immediately started. First, the controller of the substrate processing apparatus 11 sends an identification number of the loaded carrier 12 to the host computer in order to acquire the content of the plasma treatment to be performed on each of the wafers in the corresponding carrier 12 (indicated by "CID checking" in the drawing).

Thereafter, the host computer determines the content of the plasma treatment corresponding to the inquired identification number or the like and transmits to the controller of the substrate processing apparatus 11 the determined content (indicated by "determination of PJ or the like" in the drawing). The controller that has received the content of the plasma treatment loads a first wafer of the following lot from the carrier 12 into the processing chamber of the processing module 18 by controlling the operation of each module, and then performs the plasma treatment on the corresponding wafer. Next, the plasma treatment of each wafer and the loading/unloading of wafers between the carrier 12 and the processing chambers of the processing module 18 (indicated by "exchange" in the drawing) are repeated.

In the present embodiment, the time from the unloading of the carrier 12 containing the processed wafers of the present lot to the initiation of the plasma treatment of the first wafer of the following lot, i.e., the time in which the processing modules 18 of the substrate processing apparatus 11 do not perform plasma treatment on the wafers, is defined as "idle time" (standby time).

During the idle time, the plasma treatment is not performed by the processing modules 18. Therefore, the states in the processing chambers are changed from the state most suitable for the plasma treatment. As the idle time becomes long, the states in the processing chambers become close to the state unsuitable for the plasma treatment. Therefore, when the idle time is longer than the time in which the states in the processing chambers are changed to the state unsuitable for the plasma treatment (hereinafter, referred to as "idle time required for dummy treatment") (reference standby time) the dummy treatment is performed in the processing chamber of each processing module 18 in order to change the state in the processing chamber to the state suitable for the plasma treatment.

Figure 3:
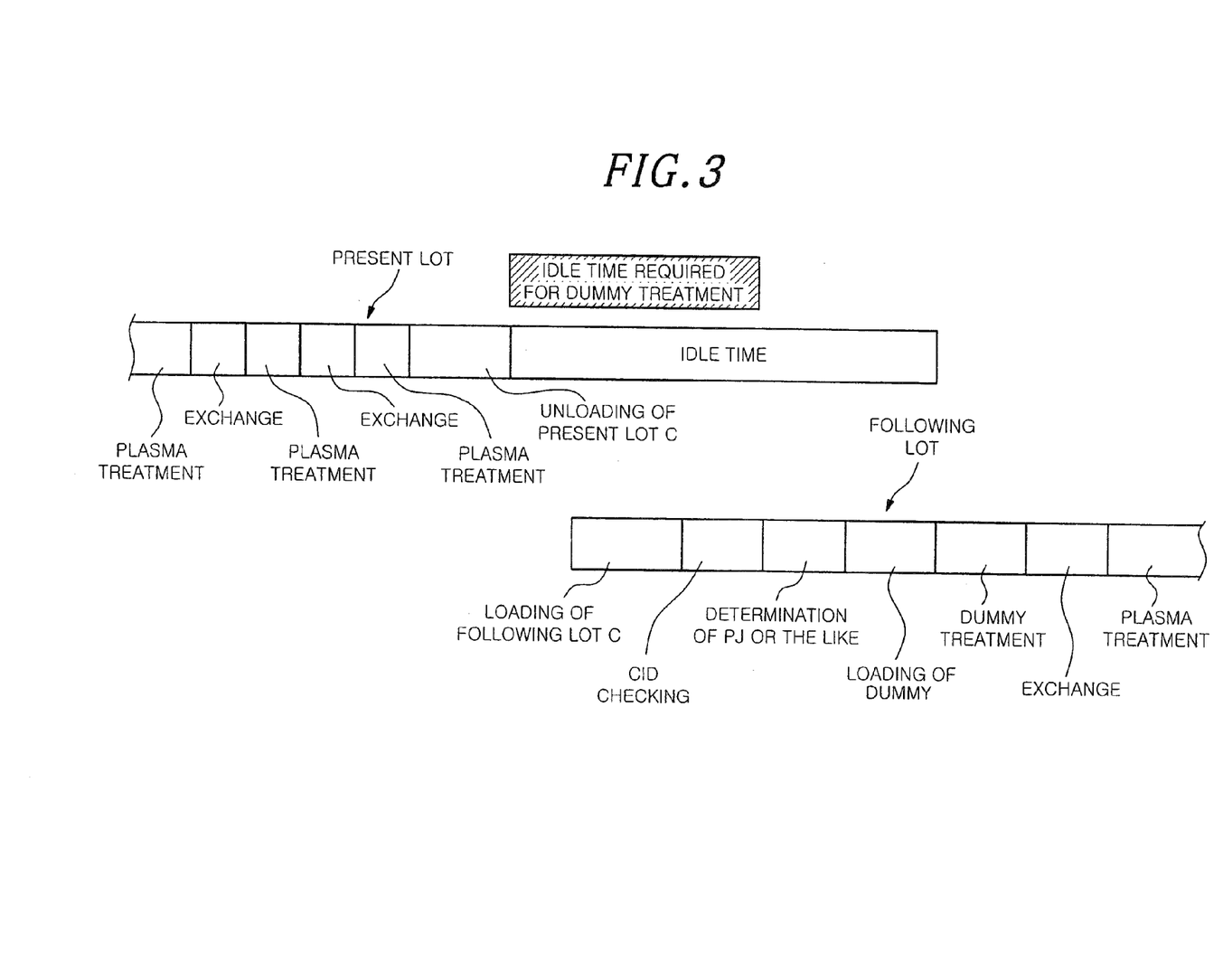
FIG. 3 is a time chart for explaining dummy treatment.

FIG. 3 is a time chart for explaining dummy treatment. A horizontal direction in FIG. 3 corresponds to elapse of time.

Referring to FIG. 3, the idle time is longer than the idle time required for dummy treatment. In that case, after the carrier 12 accommodating therein wafers of a following lot is loaded into the substrate processing apparatus 11, the plasma treatment is not immediately performed on a first wafer of the following lot after CID checking and determination of PJ or the like. Instead, a dummy wafer that is not used for manufacturing a semiconductor device is loaded into the processing chamber of each processing module 18 from the outside of the substrate processing apparatus 11 (indicated by "dummy loading" in the drawing), and dummy treatment whose content is similar to that of the plasma treatment received from the host computer is performed on the dummy wafer (indicated by "dummy treatment" in the drawing). Accordingly, the states in the processing chambers are changed to a state suitable for plasma treatment.

Next, the first wafer of the following lot is loaded into the processing chamber of the processing module 18 and subjected to plasma treatment. Then, the plasma treatment of each wafer and the loading/unloading of wafers between the carrier 12 and the processing chamber of the processing module 18 are repeated.

Since, however, the dummy treatment is essentially unnecessary as described above, the throughput is decreased and the cost may be increased.

To that end, in the present embodiment, the time for various processes in the present lot is set such that the idle time that continues after the completion of the plasma treatment of all the wafers of the present lot is minimized.

Figure 4:
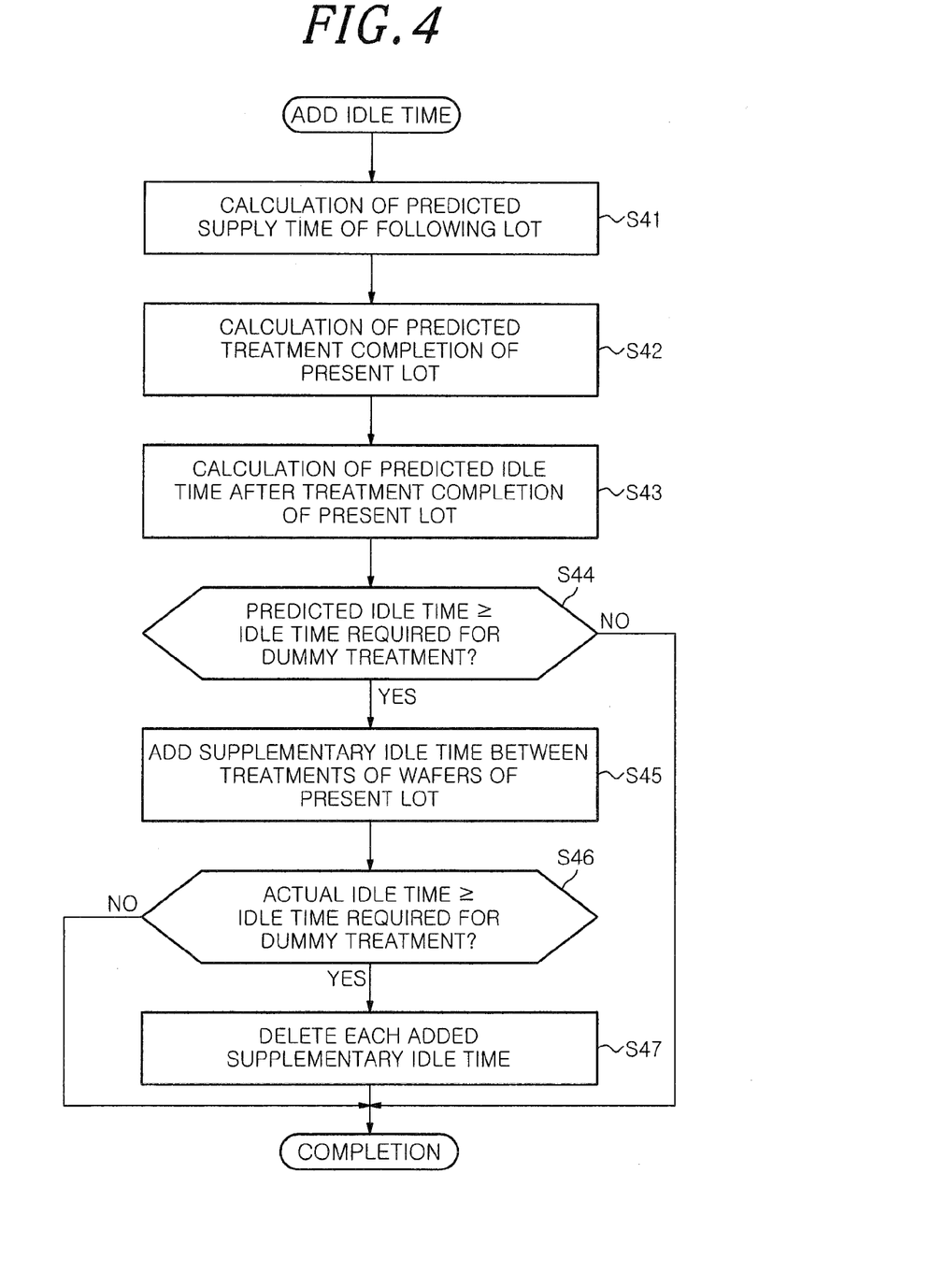
FIG. 4 is a flowchart showing additional setting of idle time in a method for setting substrate-treatment time in accordance with the present embodiment.

FIG. 4 is a flow chart showing a process of additionally setting idle time in a method for setting substrate-treatment time in accordance with the present embodiment.

Referring to FIG. 4, first, the controller of another substrate processing apparatus 11, which performs on each wafer the plasma treatment corresponding to the previous step of the plasma treatment performed on each wafer by the corresponding substrate processing apparatus 11, calculates a predicted plasma-treatment completion time of all the wafers of the following lot in the another substrate processing apparatus 11. The calculated predicted plasma-treatment completion time is transmitted to the host computer.

Next, the host computer calculates a predicted supply time of the following lot to the corresponding substrate processing apparatus 11 based on the received predicted completion time in the another substrate processing apparatus 11 (step S41) (first calculation step). The calculated predicted supply time is transmitted to the controller of the corresponding substrate processing apparatus 11.

Next, the controller of the corresponding substrate processing apparatus 11 calculates the predicted plasma-treatment completion time of all the wafers of the present lot (step S42) (second calculation step) and, then, calculates the predicted idle time (predicted standby time) after the completion of the plasma treatment of all the wafers of the present lot based on the received predicted supply time of the following lot and the predicted plasma-treatment completion time in the present lot (step S43) (third step).

Figure 5:
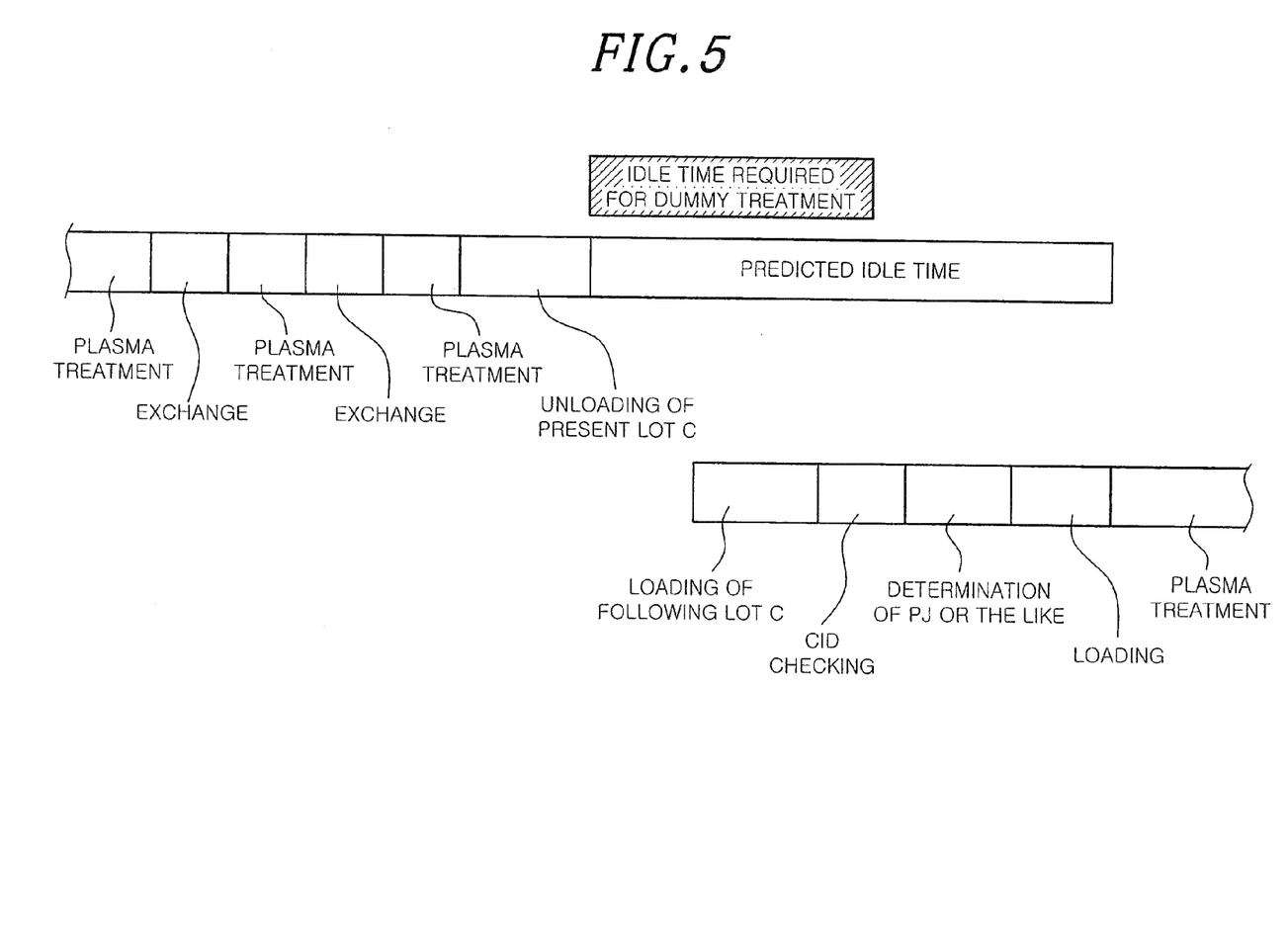
FIG. 5 is a time chart for explaining predicted idle time.

FIG. 5 is a time chart for explaining predicted idle time. A horizontal direction in FIG. 5 corresponds to elapse of time.

As shown in FIG. 5, on the assumption that the dummy treatment is not performed regardless of the supply time of the second lot, "predicted idle time" corresponds to a period of time between the unloading of the carrier 12 accommodating therein the processed wafers of the present lot and the initiation of the plasma treatment of the first wafer of the following lot.

Referring back to FIG. 4, the controller of the corresponding substrate processing apparatus 11 determines whether or not the predicted idle time is longer than the idle time required for dummy treatment (step S44) (determining step).

If it is determined in the step S44 that the predicted idle time is shorter than the idle time required for dummy treatment, the controller of the substrate processing apparatus 11 completes the present processing without changing the plasma treatment start time of each unprocessed wafer of the present lot or a loading/unloading start time of each wafer, as shown in FIG. 2, for example.

Figure 6:
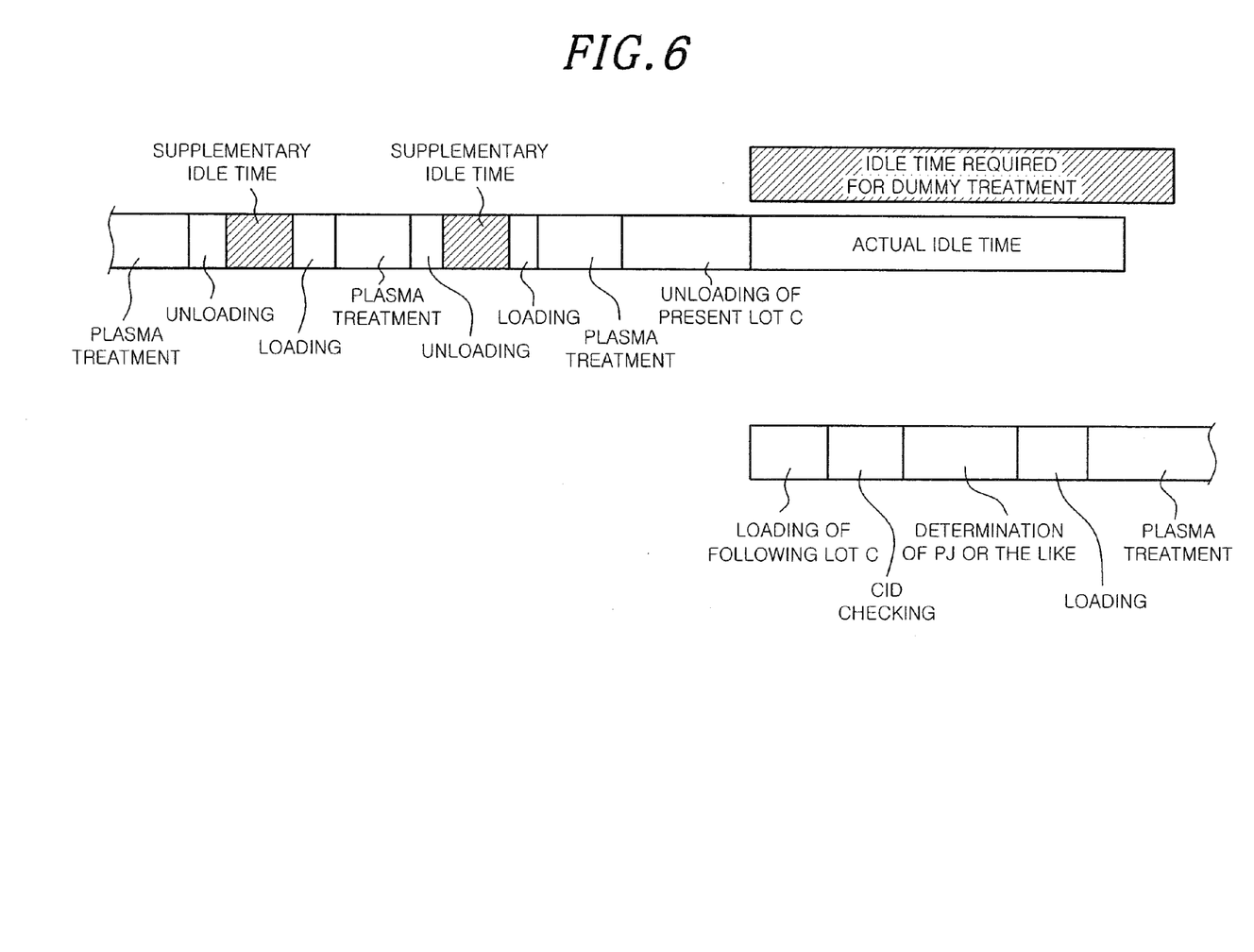
FIG. 6 is a time chart for explaining additional setting of supplementary idle time.

On the other hand, when the predicted idle time is equal to or longer than the idle time required for dummy treatment, supplementary idle time (supplementary standby time) is additionally set between the plasma treatments of unprocessed wafers of the present lot, as described in FIG. 6. More specifically, it is set between unloading of a certain wafer that has been subjected to plasma treatment from the processing chamber of the processing module 18 (indicated by "unloading" in the drawing) and loading of a next unprocessed wafer into the processing chamber of the processing module 18 (indicted by "loading" in the drawing), as described in FIG. 6 (step S45). The number of the supplementary idle time is smaller by one than the number of unprocessed wafers in the present lot. Each supplementary idle time has the same length and is set to be shorter than the idle time required for dummy treatment. Further, the supplementary idle time is set such that the time required to unload the carrier 12 accommodating therein the plasma-treated wafers of the present lot in the case of additionally setting the supplementary idle time (right end of "unloading of the present lot C" in the drawing) is not later than the predicted supply time of the following lot (left end of "loading of the following lot C" in the drawing).

Next, the idle time after the completion of the plasma treatment of all the wafers of the present lot in the case of additionally setting the supplementary idle time in the step S45 (hereinafter, referred to as "actual idle time") (another standby time) is calculated, and the controller of the substrate processing apparatus 11 determines whether or not the calculated actual idle time is longer than the idle time required for the dummy treatment (step S46) (another determining step).

If it is determined in the step S46 that the actual idle time is shorter than the idle time required for dummy treatment, the present processing is completed. On the other hand, when the actual idle time is equal to or longer than the idle time required for dummy treatment, every supplementary idle time additionally set in the step S45 is deleted (step S47) (deletion step). Then, as shown in FIG. 3, the idle time is set to be longer than the idle time required for dummy treatment, and the present processing is completed.

In accordance with the processing of FIG. 4, when the predicted idle time is equal to or longer than the idle time required for dummy treatment, the supplementary idle time is additionally set between the plasma treatments of unprocessed wafers of the present lot. Therefore, as shown in FIG. 6, the plasma-treatment completion time of all the wafers of the present lot can be extended. Accordingly, the actual idle time can be shorter than the idle time required for dummy treatment. As a result, the dummy treatment can be suppressed as much as possible.

In the processing of FIG. 4, each supplementary idle time is shorter than the idle time required for dummy treatment. Therefore, the plasma treatment of each wafer of the present lot does not require the dummy treatment.

Meanwhile, when the actual idle time obtained in the case of additionally setting each supplementary idle time in the step S45 of FIG. 4 is equal to or longer than the idle time required for the dummy treatment, the dummy treatment needs to be performed. In other words, the dummy treatment is further performed after waiting for each supplementary idle time, and this leads to the extension of the processing time. To that end, in the processing of FIG. 4, if the actual idle time is equal to or longer than the idle time required for dummy treatment, every supplementary idle time additionally set in the step S45 is deleted. Accordingly, it is possible to prevent the dummy treatment from being further performed after waiting for each supplementary idle time. As a result, unnecessary extension of the processing time can be avoided.

Figure 7:
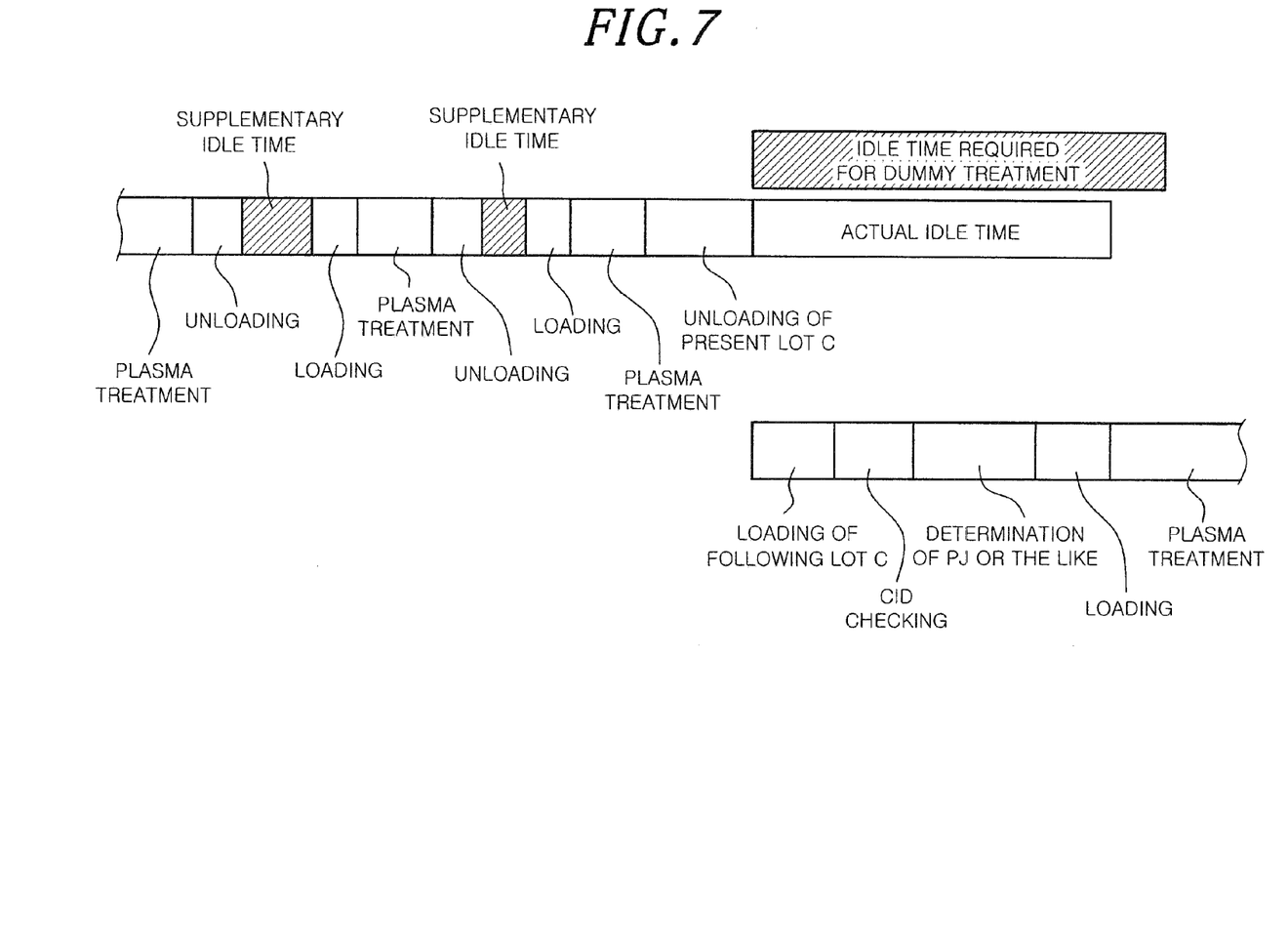
FIG. 7 is a time chart for explaining a modification of additional setting of the supplementary idle time.

In the above-described processing of FIG. 4, each supplementary idle time that is additionally set has the same length, but, it does not necessarily have the same length. As long as each supplementary idle time is shorter than the idle time required for dummy treatment and the actual idle time is shorter than the idle time required for the dummy treatment, each supplementary idle time can be freely set. For example, as shown in FIG. 7, the supplementary idle time may be set such that it becomes shorter toward the final wafer of the present lot. In that case, the sum of the idle time immediately before the plasma treatment of the first wafer of the following lot can be reduced. Accordingly, the plasma treatment can be stably performed on the first wafer of the following lot.

In addition, in the processing of FIG. 4, the controller of the another substrate processing apparatus 11 may calculate the predicted plasma-treatment completion time of all the wafers of the following lot in the another substrate processing apparatus 11 when the completion of the plasma treatment (another predetermined treatment) of the first wafer of the following lot and transmit the calculated predicted completion time to the host computer. Then the corresponding host computer may calculate the predicted supply time of the following lot to the corresponding substrate processing apparatus 11 based on the received predicted completion time. Accordingly, the calculation of the predicted idle time and whether or not the calculated predicted idle time is equal to or longer than the idle time required for dummy treatment can be performed in advance. As a result, the supplementary idle time can be additionally set with enough time.

In the processing of FIG. 4, the host computer calculates the predicted supply time of the following lot to the corresponding substrate processing apparatus 11. However, the controller of the corresponding substrate processing apparatus 11 may calculate the predicted supply time based on the predicted plasma-treatment completion time in the another substrate processing apparatus 11 which is received from the controller of the another substrate processing apparatus 11. Further, in the processing of FIG. 4, the controller of the corresponding substrate processing apparatus 11 calculates the predicted idle time. However, the host computer may calculate the predicted idle time based on the predicted plasma-treatment completion time of all the wafers of the present lot which is received from the controller of the corresponding substrate processing apparatus 11 and the predicted supply time of the following lot. Whether or not the predicted idle time is longer than the idle time required for dummy treatment may also be determined by the host computer.

While the present invention has been described by using the above embodiments, the present invention is not limited to the above embodiments.

It is to be understood that the object of the present invention can also be attained by supplying to a computer a storage medium storing a program of software that realizes the functions of the aforementioned embodiments, and then causing a CPU of the computer to read out and execute the program code stored in the storage medium.

In this case, the program itself read out from the storage medium realizes the functions of the aforementioned embodiments and, hence, the program and the storage medium storing the program constitute the present invention.

Moreover, the storage medium for supplying the program may be, e.g., a RAM, a NV-RAM, a floppy (registered trademark) disk, a hard disk, a magnetic-optical disk, an optical disk such as a CD-ROM, a CD-R, a CD-RW, a DVD (a DVD-ROM, a DVD-RAM, a DVD-RW, or a DVD+RW), a magnetic tape, a non-volatile memory card, another ROM or the like. Alternatively, the program may be downloaded from database or a computer (not shown) connected to the Internet, a commercial network, a local area network (LAN) or the like and then supplied to the computer.

Besides, it is to be understood that the functions of the aforementioned embodiments may be accomplished not only by executing the program read out by the computer, but also by causing an OS (operating system) or the like that operates on the CPU to perform a part or all of the actual operations based on instructions of the program.

Furthermore, it is to be understood that the functions of the aforementioned embodiments may also be accomplished by writing the program read out from the storage medium into a memory provided on an expansion board inserted into the computer or in an expansion unit connected to the computer, and then causing the CPU or the like provided on the expansion board or in the expansion unit to perform a part or all of the actual operations based on instructions of the program.

The forms of the program may be object codes, program executed by an interpreter, script data supplied to the OS, or the like.

DESCRIPTION OF REFERENCE NUMERALS 11 substrate processing apparatus
12 carrier
18 processing module

What is claimed is:

1. A method for setting substrate-treatment time in a substrate processing apparatus for performing predetermined treatment on substrates of a single lot one by one, the method comprising:
a first calculation step of calculating predicted supply time of a second lot to the substrate processing apparatus, the second lot being supplied to the substrate processing apparatus after a first lot including a substrate that is currently subjected to the predetermined treatment in the substrate processing apparatus;
a second calculation step of calculating predicted completion time of the predetermined treatment of all of the substrates of the first lot;
a third calculation step of calculating predicted standby time after the completion of the predetermined treatment of all the substrates of the first lot in the substrate processing apparatus based on the calculated predicted supply time and the calculated predicted completion time;
a determination step of determining whether or not the calculated predicted standby time is longer than a reference standby time required for dummy treatment; and
an additional setting step of additionally setting, when the calculated predicted standby time longer than the reference standby time, supplementary standby time between the predetermined treatments of unprocessed substrates of the first lot.

2. The method of claim 1, further comprising:
another determination step of determining, in the case where the supplementary standby time is additionally set in the additional setting step, whether or not another standby time after the completion of the predetermined treatment of all the substrates of the first lot is longer than the reference standby time; and
a deletion step of deleting, when said another standby time is longer than the reference standby time, the additionally set supplementary standby time.

3. The method of claim 1, wherein each supplementary standby time has the same length.

4. The method of claim 1, wherein when another predetermined treatment of a first substrate of the second lot is completed in another substrate processing apparatus, a predicted supply time of the second lot to the substrate processing apparatus is calculated by executing the first calculation step.

5. The method of claim 1, wherein the supplementary standby time is shorter than the reference standby time.

6. A non-transitory computer readable storage medium storing a program for executing in a computer a method for setting substrate-treatment time in a substrate processing apparatus for performing predetermined treatment on substrates of a single lot one by one,
wherein the method for setting substrate-treatment time comprises:
a first calculation step of calculating predicted supply time of a second lot to the substrate processing apparatus, the second lot being supplied to the substrate processing apparatus after a first lot including a substrate that is currently subjected to the predetermined treatment in the substrate processing apparatus;
a second calculation step of calculating predicted completion time of the predetermined treatment of all of the substrates of the first lot;
a third calculation step of calculating predicted standby time after the completion of the predetermined treatment of all the substrates of the first lot in the substrate processing apparatus based on the calculated predicted supply time and the calculated predicted completion time;
a determination step of determining whether or not the calculated predicted standby time longer than a reference standby time required for dummy treatment; and
an additional setting step of additionally setting, when the calculated predicted standby time is equal to or longer than the reference standby time, supplementary standby time between the predetermined treatments of unprocessed substrates of the first lot.

7. The storage medium of claim 6, wherein the method for setting substrate-treatment time further includes:
another determining step of determining, in the case where the supplementary standby time is set in the additional setting step, whether or not another standby time after the completion of the predetermined treatment of all the substrates of the first lot is longer than the reference standby time; and
a deletion step of deleting, when said another standby time is longer than the reference standby time, the additionally set supplementary standby time.

* * * * *